(12) United States Patent
Machado

(10) Patent No.: US 8,332,962 B1
(45) Date of Patent: Dec. 18, 2012

(54) MULTI-LAYERED POLYCHLOROPRENE TAPING MATERIAL AND METHOD OF MANUFACTURING AND APPLYING SUCH MATERIAL

(75) Inventor: Mark Raymond Machado, Newport Beach, CA (US)

(73) Assignee: The Grid, Inc., Newport Beach, CA (US)

( * ) Notice: Subject to any disclaimer, the term of this patent is extended or adjusted under 35 U.S.C. 154(b) by 13 days.

(21) Appl. No.: 12/757,560

(22) Filed: Apr. 9, 2010

Related U.S. Application Data

(63) Continuation of application No. 12/167,105, filed on Jul. 2, 2008, now abandoned.

(60) Provisional application No. 60/947,612, filed on Jul. 2, 2007.

(51) Int. Cl.
 B63C 11/04 (2006.01)
 B63C 11/00 (2006.01)
(52) U.S. Cl. ................................. 2/2.17; 2/2.15; 2/2.16
(58) Field of Classification Search .................... 2/2.15, 2/2.16, 2.17
 See application file for complete search history.

(56) References Cited

U.S. PATENT DOCUMENTS

| | | | |
|---|---|---|---|
| 2,458,166 A | | 1/1949 | Homeyer |
| 2,582,811 A * | | 1/1952 | Williams ........................ 2/2.17 |
| 2,989,752 A * | | 6/1961 | Sloane et al. ................... 2/2.15 |
| 3,246,337 A * | | 4/1966 | Copeland ......................... 2/2.15 |
| 3,583,557 A * | | 6/1971 | Staats ............................. 206/345 |
| 3,660,849 A * | | 5/1972 | Jonnes et al. .................... 2/2.15 |
| 4,169,184 A * | | 9/1979 | Pufahl ............................ 428/337 |
| 4,276,107 A * | | 6/1981 | Pufahl ............................ 156/238 |
| 4,276,341 A | | 6/1981 | Tanaka |
| 4,356,676 A * | | 11/1982 | Hauptman ................. 52/396.04 |
| 4,365,351 A * | | 12/1982 | Doerschuk et al. ............. 2/2.15 |
| 4,483,019 A * | | 11/1984 | Spangrud et al. ............... 2/2.16 |
| 4,494,246 A * | | 1/1985 | Tillbrook .......................... 2/458 |
| 4,597,818 A | | 7/1986 | Aoyama et al. |
| 4,608,114 A | | 8/1986 | Nakao |
| 4,741,050 A * | | 5/1988 | O'Kane et al. ................ 112/413 |
| 5,052,053 A * | | 10/1991 | Peart et al. ....................... 2/2.16 |
| 5,326,634 A | | 7/1994 | Sato et al. |
| 5,413,660 A | | 5/1995 | Harvey et al. |
| 5,589,246 A | | 12/1996 | Calhoun et al. |
| 5,603,116 A * | | 2/1997 | Tronc .............................. 2/2.15 |
| 5,630,229 A * | | 5/1997 | Machado et al. ................ 2/2.15 |
| 5,768,703 A * | | 6/1998 | Machado et al. ................ 2/2.15 |
| 5,783,133 A | | 7/1998 | Hara et al. |

(Continued)

FOREIGN PATENT DOCUMENTS

EP 0384598 8/1990

(Continued)

OTHER PUBLICATIONS

"Neoprene." Collins English Dictionary—Complete & Unabridged 10th Edition. HarperCollins Publishers. Mar. 21, 2012. <Dictionary.com http://dictionary.reference.com/browse/neoprene>.*

Primary Examiner — Bobby Muromoto, Jr.

(74) Attorney, Agent, or Firm — Knobbe, Martens, Olson & Bear LLP

(57) ABSTRACT

Multi-layered taping materials, methods of making such materials, methods of using such materials and articles including such materials are disclosed.

19 Claims, 2 Drawing Sheets

U.S. PATENT DOCUMENTS

| | | | |
|---|---|---|---|
| 5,896,578 A * | 4/1999 | Hunter et al. | 2/2.15 |
| 5,896,580 A | 4/1999 | Aldrich et al. | |
| 6,124,001 A | 9/2000 | Sugita et al. | |
| 6,287,685 B1 | 9/2001 | Janssen et al. | |
| 6,488,228 B2 * | 12/2002 | Davies et al. | 242/556.1 |
| 6,565,703 B2 | 5/2003 | Wenninger et al. | |
| 6,635,334 B1 | 10/2003 | Jackson et al. | |
| 6,866,928 B2 | 3/2005 | Narum et al. | |
| 6,921,566 B2 | 7/2005 | Lipstein | |
| 7,073,201 B2 | 7/2006 | Sunada et al. | |
| 7,078,093 B2 | 7/2006 | Sheridan et al. | |
| 39,114 A1 * | 1/2007 | Shiue | 2/2.15 |
| 7,211,291 B2 | 5/2007 | Harpell et al. | |
| 7,240,371 B2 | 7/2007 | Liu et al. | |
| 2002/0147437 A1 * | 10/2002 | McLaughlin et al. | 604/389 |
| 2002/0182955 A1 * | 12/2002 | Weglewski et al. | 442/59 |
| 2003/0126673 A1 | 7/2003 | Yardley | |
| 2003/0126817 A1 * | 7/2003 | Gleeson et al. | 52/460 |
| 2004/0002275 A1 | 1/2004 | Thakore | |
| 2004/0202810 A1 * | 10/2004 | Peng | 428/40.1 |
| 2005/0005337 A1 * | 1/2005 | Yokoyama | 2/2.15 |
| 2005/0205203 A1 | 9/2005 | Chang et al. | |
| 2006/0063455 A1 * | 3/2006 | Murphy | 442/327 |
| 2006/0073328 A1 * | 4/2006 | Murphy et al. | 428/355 AC |
| 2006/0141194 A1 * | 6/2006 | Carlson et al. | 428/40.1 |
| 2007/0000002 A1 | 1/2007 | Shiue | |
| 2009/0210987 A1 * | 8/2009 | Demetropoulos | 2/2.15 |

FOREIGN PATENT DOCUMENTS

| | | |
|---|---|---|
| WO | WO 2004/101226 | 11/2004 |

* cited by examiner

MULTI-LAYERED POLYCHLOROPRENE TAPING MATERIAL AND METHOD OF MANUFACTURING AND APPLYING SUCH MATERIAL

CROSS-REFERENCE TO RELATED APPLICATION

This application is a continuation of U.S. patent application Ser. No. 12/167,105, filed Jul. 2, 2008, and incorporated in its entirety by reference herein, and which claims the benefit of U.S. Provisional Application No. 60/947,612, filed Jul. 2, 2007, the entirety of which is hereby incorporated by reference.

BACKGROUND OF THE INVENTION

1. Field of the Invention

This invention relates in certain embodiments to taping material such as multi-layered polychloroprene taping material.

2. Description of the Related Art

There is a need for taping materials that provide excellent adhesion as well as excellent flexibility and elasticity. In particular, adhering materials that have large stretchability such as rubber and other elastomeric materials requires a taping material that can adequately follow the stretching or bending of the bonded material.

SUMMARY OF THE INVENTION

Certain embodiments of the invention relate to a multi-layered taping material. According to one embodiment, the taping material comprises a layer of foamed polymer and a layer of adhesive, for example a polyurethane polymer. In some embodiments, the layer of foamed polymer comprises cross-linked thermoset polychloroprene elastomer. In other embodiments, the taping material may further comprise a layer of knit or woven fabric.

Certain embodiments relate to a method of manufacturing a multi-layered polychloroprene taping material. This method may include providing one or more sheets of polychloroprene, providing an adhesive sheet or film, and laminating the adhesive to the polychloroprene sheet or sheets. The method may further comprise applying a sheet of release paper to the adhesive laminate. In other embodiments, the method may comprise the step of attaching a layer of knit or woven fabric to the polychloroprene sheets.

Other embodiments relate to a method of applying a multi-layered polychloroprene taping material, such as the taping material described above, to join pieces of rubber or other elastomeric material together. According to certain embodiments, such taping material can be used to join pieces of material comprising a wetsuit or dry suit.

DETAILED DESCRIPTION OF THE PREFERRED EMBODIMENTS

Figure 1:
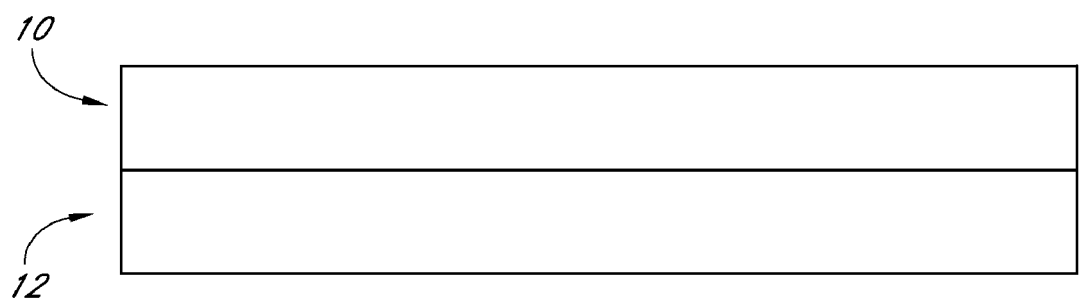
FIG. 1 illustrates a multi-layered polychloroprene taping material according to one embodiment of the present invention.

FIG. 1 illustrates a multi-layered polychloroprene taping material according to one embodiment of the present invention. According to one embodiment, the taping material comprises a layer of cross-linked thermoset polychloroprene elastomer 10 and a layer of polyurethane adhesive 12. The taping material may also comprise multiple layers of polychloroprene and/or polyurethane adhesive. In some embodiments the taping material comprises one or more layers of release paper (note that one embodiment of a multi-layer tape comprising neoprene, adhesive and release paper is shown in general at 5 of FIG. 2). In addition, in some embodiments, the taping material comprises one or more layers of knit or woven fabric (not shown). The layers of knit or woven fabric may be used to provide a decorative or branded appearance to the taping material.

In some embodiments, the polychloroprene elastomer comprises neoprene. In certain embodiments, the polychloroprene elastomer comprises expanded closed cell foam neoprene. In some embodiments, the polychloroprene elastomer comprises neoprene marketed by DuPont Chemical or Yamamoto Corporation.

The thickness of the polychloroprene layer is not particularly limited. The thickness of the polychloroprene layer may comprise about 0.1, 0.3, 0.5, 0.7, 0.9, 1.0, 1.5, or about 2.0 mm. In addition, the polychloroprene layer may comprise a thickness in a range from about any of the foregoing values to about any of the other foregoing values.

The polyurethane adhesive may be formed by reacting a poly- or di-isocyanate with one or more polyols. According to some embodiments, the polyurethane adhesive may be cross-linked. In some embodiments, the polyurethane adhesive may be exposed to the cross-linking method, resulting in fairly extensive cross-linking treatment. In these embodiments, cross-linking inhibits close packing of the polymer chains, preventing the formation of crystalline regions. The restricted molecular mobility of a cross-linked structure limits the extension of the polymer material under loading.

In some embodiments, cross-links in the polyurethane adhesive may be formed by chemical reactions that are initiated by heat and pressure. For example, in some embodiments, the polyurethane adhesive may be formed by mixing of an unpolymerized or partially polymerized resin with cross-linking reagents. In some embodiments, this reaction may begin after the cross-linked polyurethane molecular structure is excited by the initiation of the heat and pressure.

In other embodiments, the polyurethane adhesive may be only partially cross-linked, or may have little to no cross-linking.

According to certain embodiments, the polyurethane adhesive may comprise a polyurethane marketed under the trade name SEALON by Global Challenge Company Korea. The adhesive may comprise a sheet or film comprising polyurethane polymer.

In some embodiments, the softening point of the polyurethane adhesive may comprise about 120, 122, 124, 126, 128, 130, 132, or about 134° C. In addition, the softening point may comprise a temperature in a range from about any of the foregoing values to about any of the other foregoing values.

In some embodiments, the Melt Flow Index of the polyurethane adhesive may comprise about 6, 7, 8, 9 or about 10 dg/min when measured according to ASTM D1238 and ISO 1133. In addition, the Melt Flow Index of the polyurethane adhesive may comprise a value in a range from about any of the foregoing values to about any of the other foregoing values.

The thickness of the polyurethane adhesive is not particularly limited. In some embodiments, the polyurethane adhesive layer may comprise about 0.01, 0.02, 0.03, 0.05, 0.07, 0.09, 0.10, or about 0.12 mm. In addition, the polyurethane adhesive may comprise a thickness in a range from about any of the foregoing values to about any of the other foregoing values.

Figure 2:
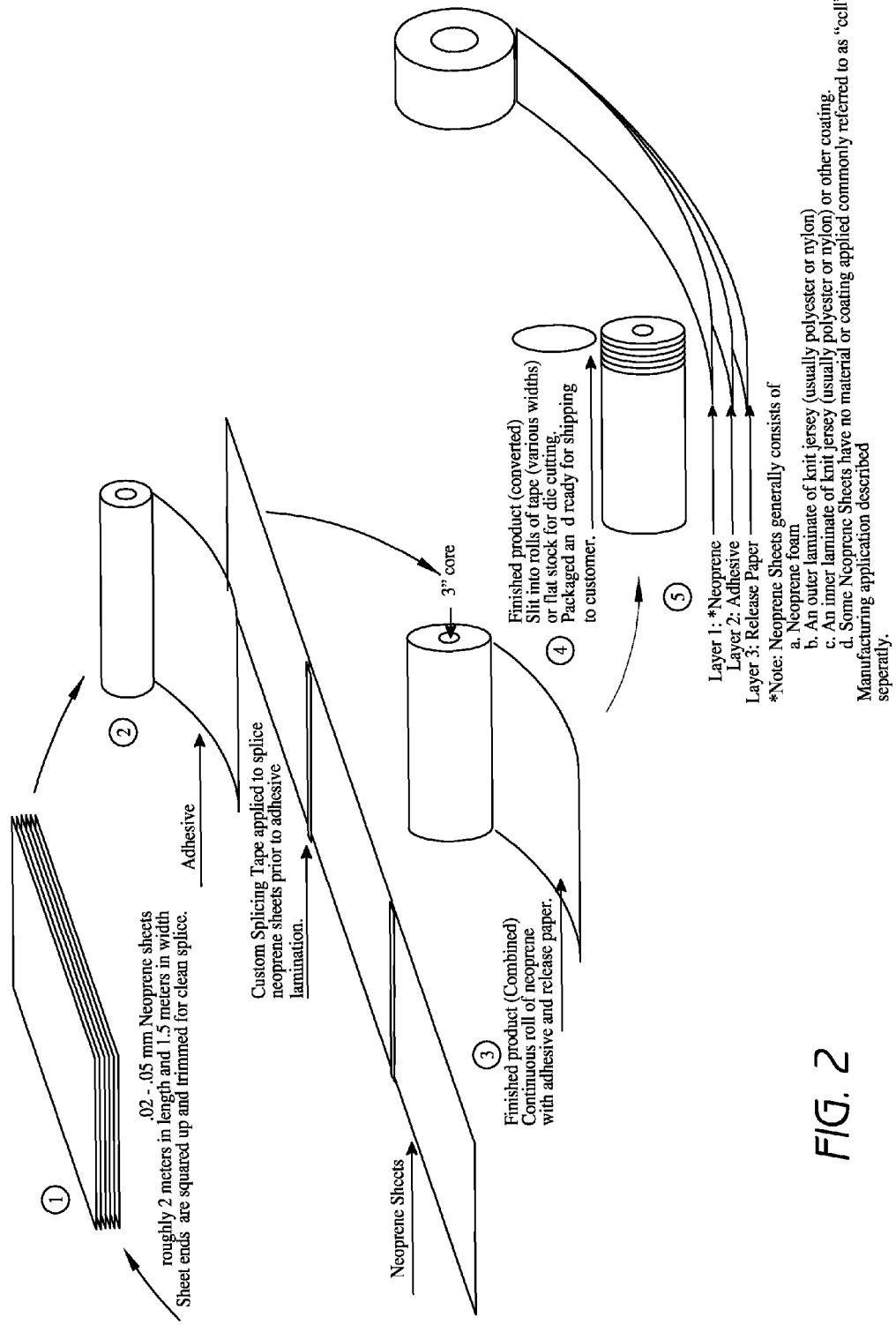
FIG. 2 illustrates a method of manufacturing a multi-layered polychloroprene taping material according to one embodiment of the present invention.

Other embodiments relate to methods for manufacturing a multi-layered polychloroprene taping material such as a polychloroprene taping material as described above. FIG. 2 illustrates a method of manufacturing a multi-layered polychloroprene taping material according to one embodiment of the present invention. Such methods may comprise the step of providing one or more sheets of polychloroprene 1, such as neoprene. In the situation where multiple sheets are provided, the sheets of polychloroprene may be placed end to end and joined together using splicing tape. In other embodiments, the polychloroprene sheets may be placed end to end but not joined together using splicing tape. The method may further comprise applying a layer of adhesive 2, such as a polyurethane adhesive, to the polychloroprene layer. In some embodiments, the method may further comprise the step of adhering a layer of knit or woven fabric to the polychloroprene sheet or sheets. The method may also comprise the step of attaching a layer of release paper to the layer of adhesive.

The particular conditions under which the layer of adhesive may be applied to the polychloroprene sheets is not particularly limited. In some embodiments, the layer of adhesive may be laminated to the polychloroprene sheets using a heated roll laminator or a pressure roll. In some embodiments, the adhesive may be laminated to the polychloroprene sheets at a temperature of about 120, 130, 140, 150, 160, 170, 180, or about 190° C. In addition, the adhesive may be laminated to the polychloroprene sheets at a temperature in a range from about any of the foregoing values to about any of the other foregoing values. In some embodiments a pressure of about 35, 40, 45, 50, 55, 60, or 65 psi may be applied to laminate the adhesive to the polychloroprene sheets. In addition, the adhesive may be laminated to the polychloroprene sheets at a pressure in a range from about any of the foregoing values to about any of the other foregoing values. The amount of time that pressure may be applied to laminate the layer of adhesive to the polychloroprene sheets is not particularly limited. In some embodiments, pressure may be applied for about 15 to about 25 seconds.

In other embodiments, the step of applying a layer of adhesive to the polychloroprene sheets may comprise spray coating the adhesive to the polychloroprene sheets. In still other embodiments, the step of applying a layer of adhesive to the polychloroprene sheets may comprise extrusion coating the adhesive to the polychloroprene sheets or dry coating the adhesive to the sheets.

The step of adhering a layer of knit or woven fabric to the polychloroprene sheets is not particularly limited. In some embodiments, the layer of knit or woven fabric may be laminated to the polychloroprene sheets using a heated roll laminator or a pressure roll.

In some embodiments, the method of manufacturing the multi-layered polychloroprene taping material may comprise cutting the laminated sheets or sheet stock into various sizes. In addition, the method may comprise the step of cutting the laminated sheets into various shapes. The shape of the laminated sheets or multi-layered polychloroprene taping material is not particularly limited and may comprise circles, rectangles, triangle and custom shape for various applications such as bonding, seam sealing, seam reinforcement, waterproofing and repair. In some embodiments, the laminated sheets may be cut into various shapes using a rotary engraved die.

According to embodiments, the method of manufacturing the taping materials may further comprise rolling the laminated sheets or sheet stock on a core 3 and slitting the rolled taping material into rolls of various widths 4.

Other embodiments of the invention related to applications of a multi-layered polychloroprene taping material such as a taping material as described above. Multi-layered polychloroprene taping material may be used with traditional machines such as automatable, hot air, ultrasonic, infrared, heat press, laser or heat rolls, and applied in a manufacturing environment. Customizable rollers guides, nozzles, and pretensioners may also be used to customize the application and tailor to various materials and needs. This application provides flexibility, strength, durability, waterproofing and resistance to saltwater, chlorine and UV light. The taping material can be used as a water-proof seam sealing or reinforcing product with exceptional bonding strength, stretch and recovery characteristics. The material may be used to join or bond blended cellular foam or sponge rubber products such as vinyl nitrile, silicone, polyurethane, polychloroprene, ethylene vinyl acetate, polyethylene and ethylene propylene diene monomer. More specifically, the taping material may be used in the manufacture and repair of wetsuits, drysuits, apparel, footwear, waders, medical and orthopedic devices, waterwear such as apparel, luggage, rainwear and automotive devices. In some embodiments, the taping material may be used to reinforce seam intersections, set zippers and set pockets. In some particular embodiments, the taping material may be used in the manufacture of a stitch-less wetsuit. In still other embodiments, the taping material may be attached to apparel or sport equipment to function as knee pads, elbow pads, and other protection and/or comfort applications.

Still other embodiments relate to an article comprising two or more pieces of material joined together or reinforced by a multi-layered polychloroprene taping material such as a taping material as described above. Neither the type of material nor the article is particularly limited. In some embodiments, the material may comprise rubber, latex, silicone, fabric, synthetic fiber, plastic, or other polymer materials. In some embodiments, the article may comprise a wetsuit, drysuit, footwear, apparel, automobile part, luggage, outdoor or water sports equipment, or orthopedic devices.

In some embodiments, the article may comprise a wetsuit or drysuit, wherein the wetsuit or drysuit comprises two or pieces of neoprene or other foamed cell material joined together by a multi-layered polychloroprene taping material such as a taping material as described above. According to some embodiments, the article may comprise a wetsuit or drysuit, wherein the wetsuit is substantially or completely stitch-free and wherein the parts of the wetsuit are bonded or joined together using a multi-layered polychloroprene taping material such as a taping material as described above, wherein the taping material is in the form of a sheet, a strip or in the form of a die cut shape. A stitch-less wetsuit according to some embodiments may comprise a zipper that is set using such a taping material.

In still other embodiments, the article may comprise an article of clothing, wherein the article of clothing comprises two or more pieces of rubber, latex or fabric joined together by a multi-layered polychloroprene taping material such as a taping material as described above. In still other embodiments, the article may comprise a zipper or pocket set together using a multi-layered polychloroprene taping material such as a taping material as described above.

It will be understood that the foregoing is only illustrative of the principles of the invention, and that various modifications, alterations, and combinations can be made by those skilled in the art without departing from the scope and spirit of the invention.

What is claimed is:

1. A multi-layered flexible taping material, comprising:
a rubber layer, wherein the rubber layer comprises a plurality of at least three polychloroprene polymer sheets, each sheet having a first end, a second end, and a length therebetween;
a heat sensitive adhesive layer comprising polyurethane polymer; and
a layer of release paper, wherein the adhesive layer covers substantially an entire lower surface of the rubber layer and is disposed substantially between the rubber layer and the release paper, wherein each sheet has its first end or its second end spliced together with the first end or the second end of an adjacent sheet such that the length of the rubber layer is substantially equal to or greater than the total lengths of the at least three sheets.

2. The multi-layered flexible taping material according to claim 1, further comprising a fabric layer, wherein the fabric comprises knit or woven fabric.

3. The multi-layered flexible taping material according to claim 1, wherein the release paper covers substantially an entire lower surface of the adhesive layer.

4. The multi-layered flexible taping material according to claim 2, wherein the rubber layer is disposed substantially between the heat sensitive adhesive layer and the fabric layer.

5. The multi-layered flexible taping material according to claim 1, wherein the polychloroprene comprises neoprene.

6. A method of manufacturing a multi-layered taping material, comprising:
providing a first sheet of polychloroprene rubber, a second sheet of polychloroprene rubber, a third sheet of polychloroprene rubber, a sheet or film of heat-sensitive polyurethane adhesive, and a sheet of release paper, wherein each of the first sheet, the second sheet, and the third-sheet of polychloroprene rubber comprises a first end, a second end, an upper surface and a lower surface, and the sheet or film of heat-sensitive polyurethane adhesive comprises an upper surface and a lower surface;
placing the second end of the first sheet of polychloroprene rubber adjacent to the first end of the second sheet of polychloroprene rubber;
splicing together the second end of the first sheet of polychloroprene rubber and the first end of the second sheet of polychloroprene rubber;
placing the first end of the third sheet of polychloroprene rubber adjacent to the second end of the second sheet of polychloroprene rubber;
splicing together the first end of the third sheet of polychloroprene rubber and the second end of the second sheet of polychloroprene rubber;
laminating the upper surface of the sheet or film of heat-sensitive polyurethane adhesive to the lower surfaces of the first, second, and third sheets of polychloroprene rubber; and
attaching the sheet of release paper to the lower surface of the heat-sensitive polyurethane adhesive.

7. The method according to claim 6, further comprising attaching a layer of fabric to the upper surfaces of the first, second, and third sheets of polychloroprene rubber.

8. The method according to claim 6, wherein the polychloroprene comprises neoprene.

9. The method according to claim 6, wherein the first, second, and third sheets of polychloroprene rubber are spliced-together using splicing tape.

10. The method according to claim 6, further comprising rolling the laminated sheets on a core.

11. The method according to claim 6, wherein each of the first, second, and third sheets of polychloroprene rubber has a length of at least about 2 meters.

12. The method according to claim 6, wherein each of the first, second, and third sheets of polychloroprene rubber has a thickness of between about 0.02 mm and about 0.05 mm.

13. The method according to claim 10, further comprising slitting the rolled sheets into smaller rolls.

14. The multi-layered flexible taping material according to claim 1, wherein the rubber layer comprising a plurality of polychloroprene polymer sheets has a length of at least about 6 meters.

15. The multi-layered flexible taping material according to claim 1, wherein each of the plurality of polychloroprene polymer sheets has a thickness of between about 0.02 mm and about 0.05 mm.

16. The multi-layered flexible taping material according to claim 1, wherein the plurality of polychloroprene polymer sheets are spliced together with splicing tape.

17. The multi-layered flexible taping material according to claim 1, wherein the taping material is in a form of a roll.

18. The multi-layered flexible taping material according to claim 1, wherein the fabric layer comprises a plurality of fabric layers.

19. The multi-layered flexible taping material according to claim 1, wherein the polyurethane polymer comprises a softening point of between about 120° C. and about 134° C.

* * * * *